(12) United States Patent
Mengoli

(10) Patent No.: US 6,539,923 B1
(45) Date of Patent: Apr. 1, 2003

(54) APPARATUS FOR MIXING AIR AND FUEL IN AN INTERNAL COMBUSTION ENGINE

(75) Inventor: Gianluigi Mengoli, Maddalena di Budrio (IT)

(73) Assignee: Ducati Motor Holding S.p.A., Bologna (IT)

( * ) Notice: Subject to any disclaimer, the term of this patent is extended or adjusted under 35 U.S.C. 154(b) by 0 days.

(21) Appl. No.: 10/219,406

(22) Filed: Aug. 15, 2002

(30) Foreign Application Priority Data

Sep. 14, 2001 (EP) .......................................... 01830586

(51) Int. Cl.[7] .............................................. F02M 51/00
(52) U.S. Cl. ........................ 123/472; 123/486; 123/583; 123/184.55
(58) Field of Search ................................ 123/472, 486, 123/583, 184.55, 478, 480, 492, 579, 184.53

(56) References Cited

U.S. PATENT DOCUMENTS

| | | | | |
|---|---|---|---|---|
| 5,074,257 A | * | 12/1991 | Amano et al. | 123/184.42 |
| 5,143,026 A | * | 9/1992 | Brustle et al. | 123/184.55 |
| 5,628,287 A | | 5/1997 | Brackett et al. | |
| 6,371,069 B1 | * | 4/2002 | Fischer | 123/184.55 |
| 6,460,501 B1 | * | 10/2002 | Fischer et al. | 123/184.55 |

FOREIGN PATENT DOCUMENTS

| | | |
|---|---|---|
| DE | 1 009 429 | 5/1957 |
| EP | 1 024 258 A3 | 8/2000 |
| EP | 1 024 258 A2 | 8/2000 |
| GB | 1175792 | 12/1969 |
| JP | 63198721 | 8/1988 |

* cited by examiner

Primary Examiner—Bibhu Mohanty
(74) Attorney, Agent, or Firm—Fay, Sharpe, Fagan, Minnich & McKee, LLP

(57) ABSTRACT

An apparatus (1) for mixing air and fuel in an internal combustion engine comprises at least two throttle bodies (2a, 2b) having an inlet and an outlet and at least two air chokes (8), each located at the inlet of one of the throttle bodies (2a, 2b) and coaxial with the throttle body (2a, 2b). Each air choke (8) has a portion (9) that is fixed and a portion (10) that moves coaxially relative to the fixed portion (9) between a first position in which the air choke (8) presents a first height (L1) and a second position in which the air choke (8) presents a second height (L2) that is greater than the first height (L1). The apparatus (1) further comprises at least two independent actuators (13) each moving one of the mobile portions (10) between the first and second positions, and at least two fuel injectors (11) located above the air chokes (8).

8 Claims, 4 Drawing Sheets

APPARATUS FOR MIXING AIR AND FUEL IN AN INTERNAL COMBUSTION ENGINE

BACKGROUND OF THE INVENTION

The present invention relates to apparatus for mixing air and fuel in an internal combustion engine.

It is known that the fuel for an internal combustion engine must be atomized and mixed with air in order to enable combustion to occur inside the cylinder.

In petrol engines, the air and fuel are usually mixed before they enter the combustion chamber by a carburetor or by an injector connected to a throttle body.

In certain types of apparatus for mixing air and fuel known to prior art, a throttle body has at its intake end a tapered pipe known in engine jargon as air choke or funnel. The air choke is designed to convey the air or the mixture of air and fuel through the intake pipe with the minimum of flow resistance.

Close to the inlet of the air choke, there is an injector which reduces the liquid fuel to a fine spray and enables it to be mixed with the air as the two components travel from the inlet to the combustion chamber.

In other apparatus of this type, the height of the air choke is variable in accordance with the revolutions per minute (rpm) at which the engine is running.

Indeed, the total length of the intake pipes, that is to say, the sum of the part inside the cylinder head plus the choke, is an important parameter that considerably affects volumetric efficiency and hence engine power.

Each rpm level corresponds to an optimum length of the intake pipes, once the other construction parameters, such as pipe and valve size and engine timing, have been defined.

Prior art, for example, patent DE-1 009 429, also teaches the use of mechanical, hydraulic or pneumatic mechanisms connected to the crankshaft to vary the length of the intake pipes and in particular of the final air choke.

In this kind of apparatus, the length of the pipes depends solely on engine rpm and the air chokes of all the cylinders are lengthened or shortened by the same amount by the same actuator.

The applicant has found that the above described type of apparatus for mixing air and fuel for internal combustion engines can be improved in many respects, especially to optimize engine performance.

Indeed, the air and fuel mixing apparatus described above does not allow the air chokes of the different throttle bodies to be changed independently of each other.

This is a disadvantage because not all the cylinders in an engine work in exactly the same way, especially if their configuration is not symmetrical, and therefore they should be optimized by using air chokes of different lengths.

A motorcycle engine, for example, is mounted in such a way as to minimize its transversal dimension, limiting the width, and hence the frontal cross section, of the motorcycle.

Thus, two- or four-cylinder V or L engines are mounted in such a way that the crankshaft is transversal to the longitudinal axis of the motorcycle. In a two-cylinder engine, one of the cylinders is in front of the other. The air chokes of the two cylinders therefore open at positions where the fluid dynamic conditions are different because the parts of the air box facing the air chokes have different shapes and/or are affected by different types of aerodynamic flow.

Moreover, in the apparatus of the type described above, it is not possible to set the optimum length of each pipe on the basis of engine operating parameters in play at any given moment.

SUMMARY OF THE INVENTION

The present invention has for an object to provide air and fuel mixing apparatus for an internal combustion engine where the intake pipes of at least two cylinders can be varied in length independently of one another.

Another object of the invention is to provide an air and fuel mixing apparatus for an internal combustion engine where the length of the intake pipes can be varied in accordance with a multiplicity of engine operating parameters.

The invention has for an object in particular to provide an air and fuel mixing apparatus which is designed to be mounted in an internal combustion engine and which allows the length of each intake pipe to be set according to the rpm and opening percentage of the butterfly valve at any given moment while the engine is running.

These objects, as well as others that emerge from the description below, are accomplished by an air and fuel mixing apparatus for an internal combustion engine as described in the claims below.

BRIEF DESCRIPTION OF THE DRAWINGS

Preferred embodiments of an apparatus according to the invention for mixing air and fuel in an internal combustion engine will now be described, without restricting the scope of the inventive concept, with reference to the accompanying drawings in which.

DESCRIPTION OF THE PREFERRED EMBODIMENTS

Figure 1:
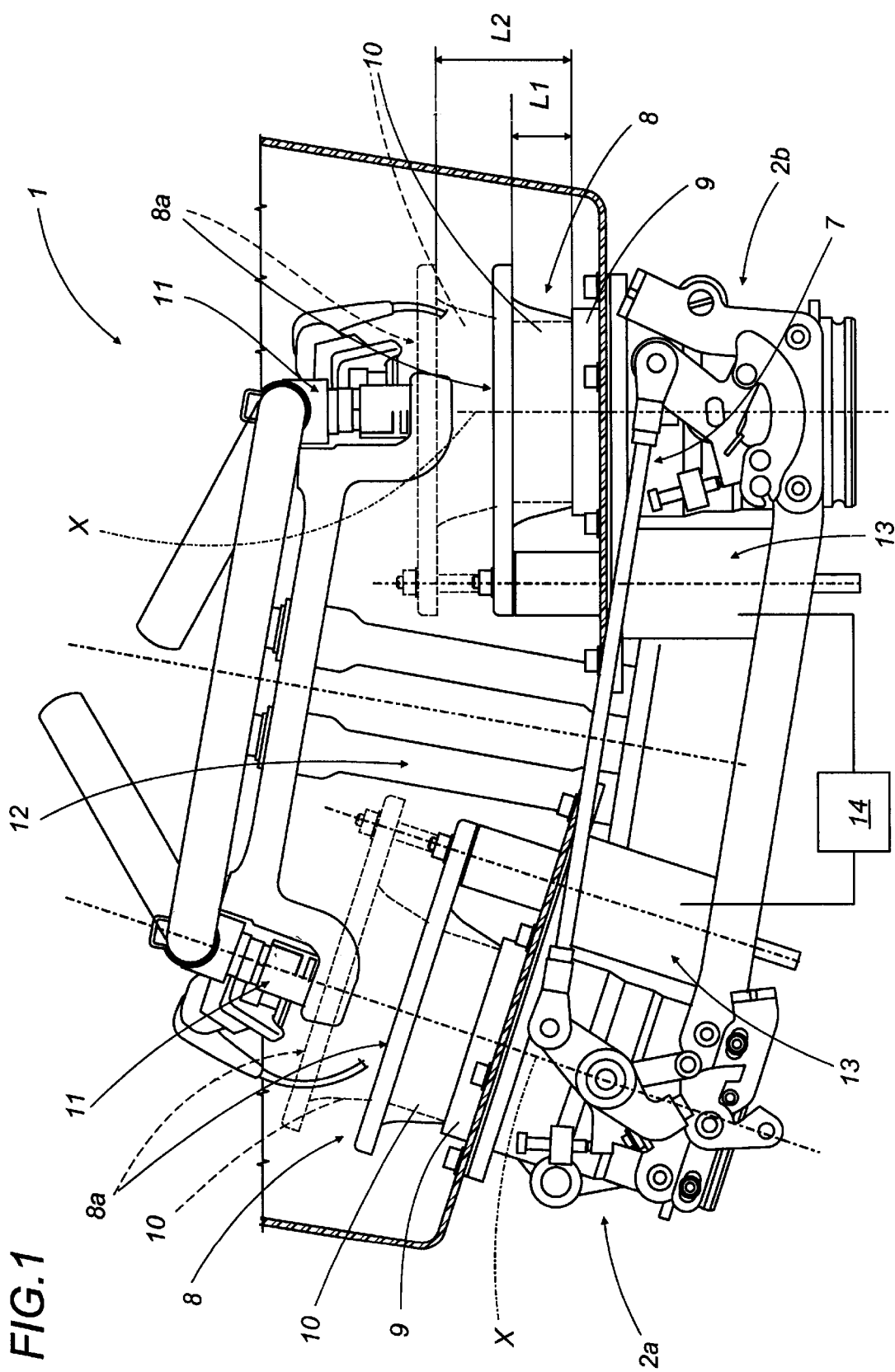
FIG. 1 is a side view of an air and fuel mixing apparatus designed for an internal combustion engine and made according to the present invention.

In the accompanying drawings, the numeral 1 denotes an apparatus for mixing air and fuel in an internal combustion chamber.

The apparatus 1 comprises at least two throttle bodies 2a, 2b, each connected to one of two cylinders in an internal combustion engine of conventional type and therefore not illustrated.

Each throttle body 2a, 2b has an inlet 3 and an outlet 4 and comprises at least one tubular element 5 that houses a butterfly valve 6 hinged to the tubular element 5 between the inlet 3 and the outlet 4.

The butterfly valve 6 is used to vary the section of the air passage of the tubular element 5 and is controlled by appropriate means 7.

The outlet 4 of each throttle body 2a, 2b is in fluid communication with the cylinder intake pipe.

Each throttle body 2a, 2b has an air choke 8 mounted coaxially with the throttle body 2a, 2b itself on its inlet 3. The air choke 8 consists of a tapered pipe whose cross section at the inlet end 8a is larger than the section of the air passage of the tubular element 5 and whose outlet end 8b is connected to the tubular element 5 itself.

The air choke 8 comprises a first portion 9 and second portion 10 that are coaxial with each other. The first portion 9 is fixed to the throttle body 2a, 2b whilst the second portion 10 slides coaxially on the fixed portion 9 between a first position in which the air choke 8 presents a first height L1 and a second position in which the air choke 8 presents a second height L2 that is greater than the first height L1.

Figure 3:
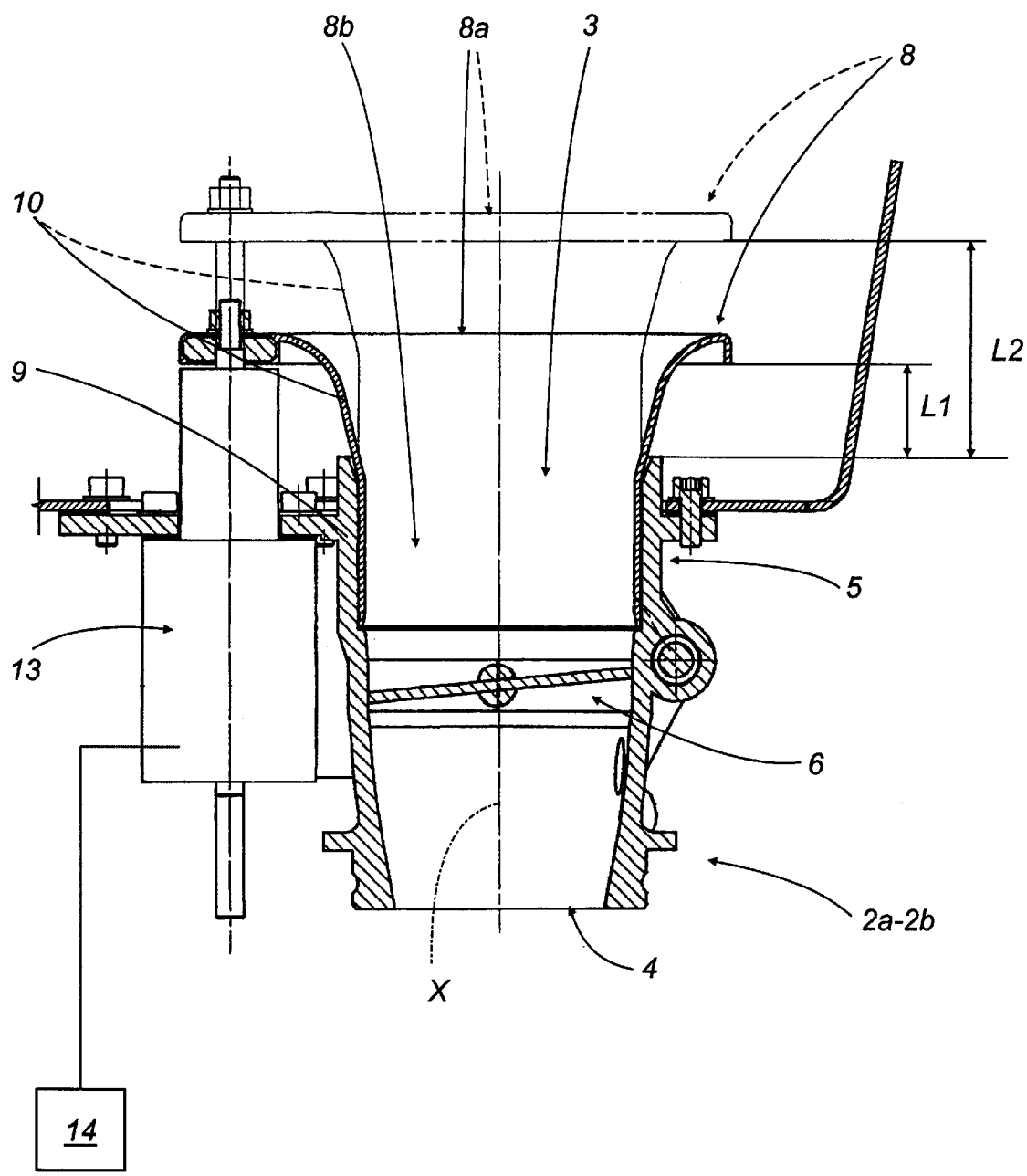
FIG. 3 is a cross section of a throttle body forming part of the apparatus illustrated in FIGS. 1 and 2.

In a first embodiment illustrated in FIG. 3, the mobile second portion 10 of the air choke 8 is mounted inside the fixed first portion 9. This embodiment keeps the outer dimensions substantially the same as those of fixed length versions.

Alternatively, in another embodiment which is not illustrated, the mobile second portion 10 of the air choke 8 is mounted outside the first portion 9 so as to increase the length of the stroke without interfering with the butterfly valve 6 during relative movements.

This embodiment is particularly useful when the height of the mobile portion 10 is substantially the same as the height of the fixed portion 9 so as to be able to extend the choke 8 as much as possible. Thus, in the position corresponding to the smallest height L1, where the mobile portion 10 is fully retracted, this embodiment guarantees that there is no interference with the butterfly valve 6.

The apparatus 1 further comprises at least one injector 11 fitted above each air choke 8, designed to spray the fuel close to the inlet 8a of the air choke 8 in such a way that the fuel is mixed with the air that is sucked into the cylinder through the throttle body 2a, 2b.

Advantageously, each injector 11 is positioned on the longitudinal axis X of the throttle body 2a, 2b and of the air choke 8, so that the fuel is injected along an axis that is as far as possible from the walls of the air choke 8, thus preventing the particles of fuel from being deposited on them.

In the embodiment illustrated in FIG. 1, each injector 11 is mounted on a frame 12 that is integral with the throttle body 2a, 2b and with the fixed portion 9 of the air choke 8. Thus, the distance between the injector 11 and the air choke 8 varies with the length of the air choke 8 itself.

Figure 2:
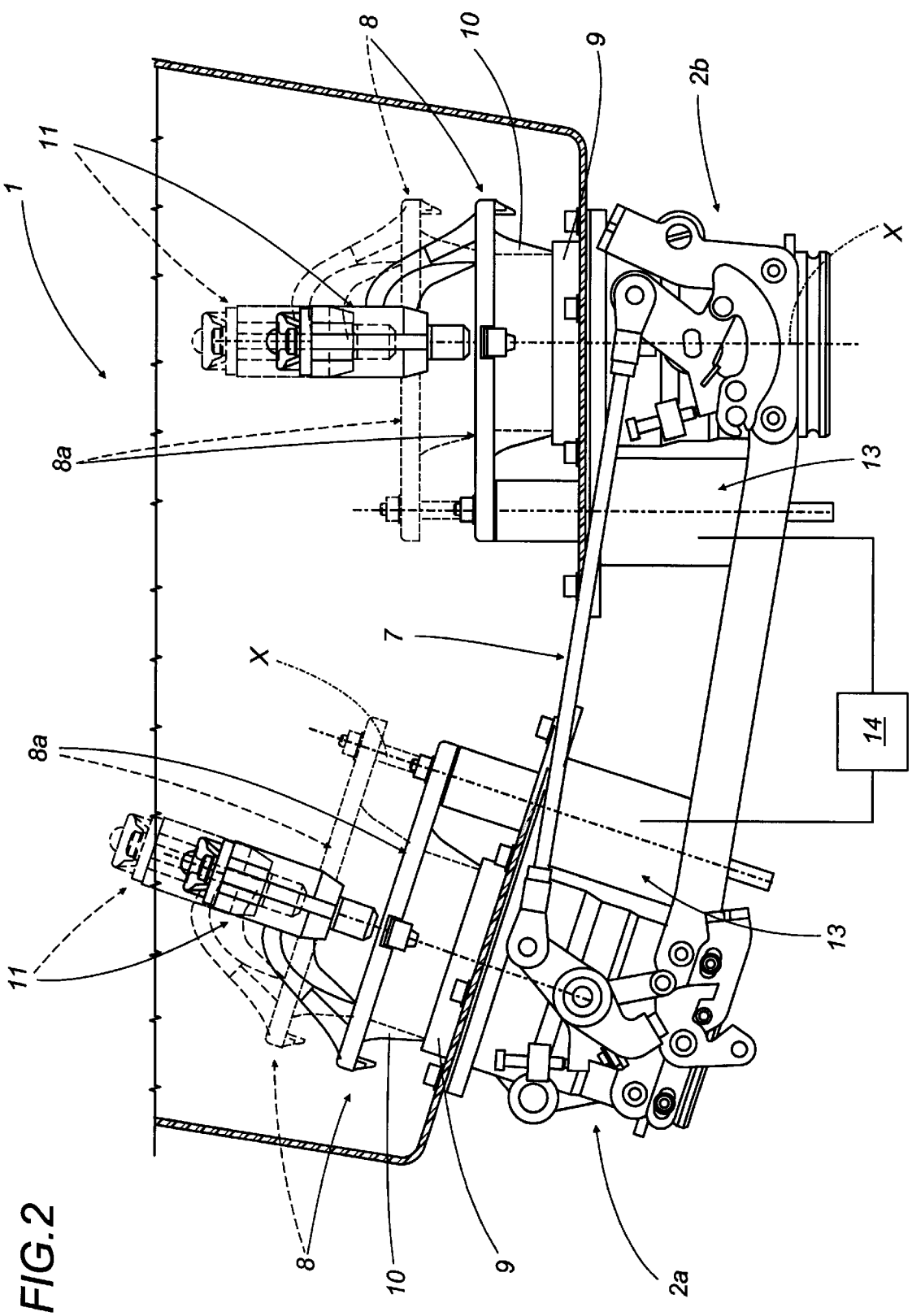
FIG. 2 is a side view of another embodiment of an air and fuel mixing apparatus for an internal combustion engine.

Alternatively, the injector 11 is linked to and moves with the mobile portion of the air choke 8, for example by mounting it, as shown in FIG. 2, on a frame attached to the mobile portion 10 so that the distance between injector and air choke remain constant.

Each throttle body 2a, 2b further comprises an actuator 13 designed to move the mobile portion 10 of the corresponding air choke 8 independently of the mobile portions 10 of the other chokes 8.

Advantageously, the actuator 13 is controlled by an electronic control unit 14 connected to the actuators 13 and designed to control the actuators 13 independently in accordance with respective maps stored in it.

Thus, a portion of the control unit 14 memory is used to store the positions of the mobile portions 10 of the air chokes 8 at characteristic points of engine operation.

For example, for any given rpm interval in the full range of engine operation, for any given interval of butterfly valve opening percentage and for any cylinder, the control unit 14 has stored in its memory a defined length for the choke 8 and can drive the corresponding actuator 13 to adjust the length of the air choke 8 accordingly when the rpm and butterfly opening percentage values fall within these intervals during engine operation.

Thus, each of the mobile portions 10 can move to a plurality of intermediate positions between the first and second positions and corresponding to the stored values.

Advantageously, the control unit 14 also controls the engine ignition and injection parameters. Its memory therefore contains a map for ignition, a map for injection and a map for the lengths of the air chokes 8, obviously for each cylinder.

The air chokes 8 and the injectors 11 are housed preferably in a chamber 15 formed within a container 16, usually called air box, having at least one inlet 17 through which air flows in through a pipe 18 which, at least at the part of it near the inlet, is oriented in the direction in which the vehicle where the engine is mounted is travelling.

When the vehicle is moving, the container 16 increases air pressure, or prevents a vacuum from forming, close to the air chokes 8. It does this by using the dynamic pressure of the air flowing in through the pipe inlet 17.

Figure 4:
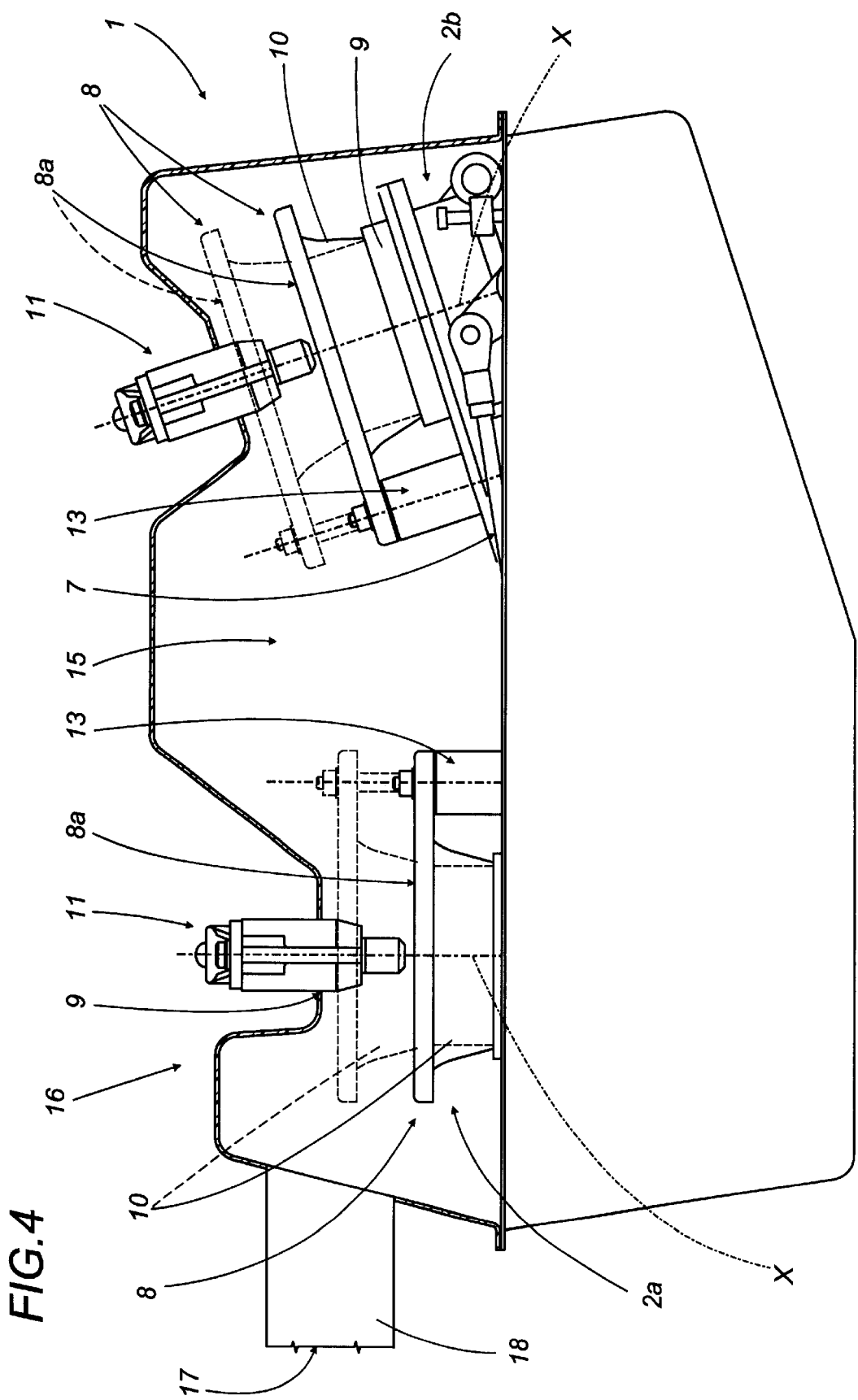
FIG. 4 is a side view, partly in cross section, of yet another embodiment of the air and fuel mixing apparatus according to the invention.

Advantageously, in another embodiment illustrated in FIG. 4, the injectors 11 are mounted on the container 16 in holes 19 made in the container 16 itself.

The nozzle of each injector 11 permanently faces the inside of the chamber 15 and lies on the same axis as the corresponding air choke 8. The body of the injector 11 is positioned inside the hole 19 and thus seals it. This solution improves the air flow for engine intake because the absence of parts for mounting the injectors. Furthermore, when the injectors 11 have to be changed or for other maintenance purposes, they can be accessed directly from outside the container 16 without having to open the container 16.

The present invention achieves important advantages.

First of all, the air and fuel mixing apparatus for an internal combustion engine according to the invention optimizes the performance of each cylinder by operating separately on the length of each air choke.

Further, the apparatus according to the invention optimizes the performance of each cylinder according to the instantaneous operating conditions of the engine.

Thus, the electronic control of air choke length permits selection of the optimum length for different ranges of engine rpm and butterfly valve opening percentage.

Moreover, the special design of the air box ensures quick and easy access to the injectors, thus greatly facilitating maintenance operations.

What is claimed is:

1. An apparatus for mixing air and fuel in an internal combustion engine of the type comprising:
    at least two throttle bodies each having an inlet and an outlet; the outlet of each throttle body being in fluid communication with an intake pipe connected with an engine cylinder;
    at least two air chokes, each mounted at the inlet of a throttle body in such a way that it is coaxial with the throttle body; each of the air chokes comprising a fixed portion and a mobile portion that moves coaxially relative to the fixed portion between a first position in which the air choke presents a first height and a second position in which the air choke presents a second height that is greater than the first height;
    at least two fuel injectors, each positioned above one of the air chokes; the apparatus further comprising at least two separate actuators each designed to move one of the mobile portions between the first and second positions.

2. The apparatus according to claim 1, further comprising an electronic control unit connected to the actuators and designed to control each actuator independently in accordance with respective maps stored in the control unit.

3. The apparatus according to claim 1, wherein the mobile portion of the air choke is mounted on the inside of the fixed portion.

4. The apparatus according to claim 1, wherein the mobile portion of the air choke is mounted on the outside of the fixed portion.

5. The apparatus according to claim 1, wherein each of the mobile choke portions can move to a plurality of intermediate positions between the first and second positions.

6. The apparatus according to claim 1, wherein each injector is integral with the mobile portion of the corresponding air choke to keep the distance from the air choke constant when the mobile portion moves.

7. The apparatus according to claim 1, wherein each injector is integral with the fixed portion of the corresponding air choke to vary the distance from the air choke when the mobile portion moves.

8. The apparatus according to claim 1, further comprising a container forming a chamber that houses the air chokes; the injectors being mounted on the container in such a way as to face the chamber.

* * * * *